United States Patent
Chen

(10) Patent No.: US 9,107,512 B2
(45) Date of Patent: Aug. 18, 2015

(54) CUSHIONING SUPPORT DEVICE AND METHOD OF MAKING THE SAME

(71) Applicant: Forsound Corp., Kaohsiung (TW)

(72) Inventor: Fu-Chieng Chen, Kaohsiung (TW)

(73) Assignee: Forsound Corp., Kaohsiung (TW)

( * ) Notice: Subject to any disclaimer, the term of this patent is extended or adjusted under 35 U.S.C. 154(b) by 12 days.

(21) Appl. No.: 13/869,817

(22) Filed: Apr. 24, 2013

(65) Prior Publication Data

US 2013/0232697 A1    Sep. 12, 2013

Related U.S. Application Data

(63) Continuation-in-part of application No. 13/069,914, filed on Mar. 23, 2011, now abandoned.

(51) Int. Cl.
| | |
|---|---|
| *A47C 16/00* | (2006.01) |
| *A47C 27/08* | (2006.01) |
| *B32B 37/14* | (2006.01) |
| *B32B 3/18* | (2006.01) |
| *B32B 5/32* | (2006.01) |

(52) U.S. Cl.
CPC ............... *A47C 27/085* (2013.01); *B32B 3/18* (2013.01); *B32B 5/32* (2013.01); *B32B 37/144* (2013.01); *B32B 2266/0278* (2013.01)

(58) Field of Classification Search
CPC ........ A47C 7/021; A47C 27/15; A47C 7/022; A47C 27/148; A47C 27/085; A47C 27/10; A47C 27/14; A47C 31/126; A47G 9/10; A61G 5/1043; A61G 2005/1045; A61G 7/05769; A61G 7/05715; A61G 7/05738; A61G 7/05723; A61G 7/065
USPC .................. 5/652, 653, 654, 655.5, 655.9
See application file for complete search history.

(56) References Cited

U.S. PATENT DOCUMENTS

| | | | | |
|---|---|---|---|---|
| 4,753,480 | A * | 6/1988 | Morell | 297/452.27 |
| 5,429,852 | A * | 7/1995 | Quinn | 428/71 |
| 5,797,155 | A * | 8/1998 | Maier et al. | 5/654 |
| 5,902,011 | A * | 5/1999 | Hand et al. | 297/284.6 |
| 6,206,474 | B1 * | 3/2001 | Kruse et al. | 297/452.41 |
| 6,219,867 | B1 * | 4/2001 | Yates | 5/655.5 |
| 6,677,026 | B1 | 1/2004 | Yates | |
| 6,935,273 | B2 * | 8/2005 | Throndsen et al. | 119/431 |
| 7,530,640 | B2 * | 5/2009 | Walters et al. | 297/440.22 |
| 7,614,704 | B2 * | 11/2009 | Whelan et al. | 297/452.25 |
| 8,584,286 | B2 * | 11/2013 | Call | 5/655.3 |
| 8,776,798 | B2 * | 7/2014 | Choi et al. | 128/845 |

(Continued)

*Primary Examiner* — Timothy D Collins
*Assistant Examiner* — Richard G Davis
(74) *Attorney, Agent, or Firm* — WPAT, P.C.; Anthony King; Kay Yang

(57) ABSTRACT

A cushioning support device and a method for making the same are disclosed. The device comprises a first polyurethane foam having a non-slip sheet attached on a surface of the first foam, a second polyurethane foam having a resting sheet attached on a surface of the second foam, and a compound pressure-redistributing body. The first and second polyurethane foams are arranged one over another into a stack which is welded and envelops to form at least an internal pocket along a weld line. The internal pocket houses the pressure-redistributing body, and it comprises a foam and a solid gel attached on a top surface of the foam, wherein the solid gel is securely positioned by way of melting. Dips of the gel can lodge into the small interstices of the foam material during the melting process; the gel gets into a solid state after solidification.

3 Claims, 19 Drawing Sheets

(56) References Cited

U.S. PATENT DOCUMENTS

| | | | |
|---|---|---|---|
| 2007/0061978 A1* | 3/2007 | Losio | 5/655.5 |
| 2007/0246157 A1* | 10/2007 | Mason et al. | 156/242 |
| 2010/0237082 A1* | 9/2010 | Fernandez | 220/592.17 |
| 2012/0060295 A1* | 3/2012 | Flick et al. | 5/655.5 |
| 2013/0000045 A1* | 1/2013 | Losio | 5/655.3 |

* cited by examiner

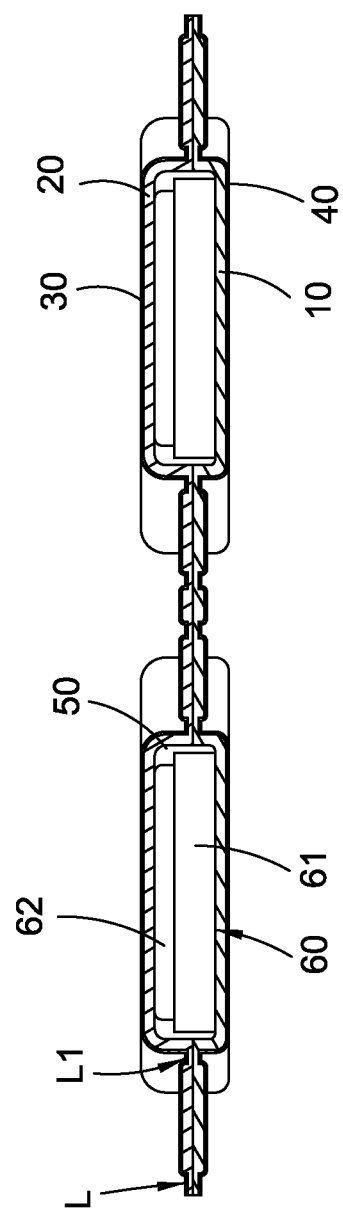

CUSHIONING SUPPORT DEVICE AND METHOD OF MAKING THE SAME

CROSS-REFERENCE TO RELATED PATENT APPLICATION

This patent application is a continuation-in-part of copending U.S. patent application Ser. No. 13/069,914, filed Mar. 23, 2011.

BACKGROUND OF THE INVENTION

1. Field of the Invention

The present invention relates to a cushioning support device that provides pressure redistribution, and a method for making the same. More particularly, it relates to a cushioning support device used in providing pressure support for a human body as well as a method for making the device.

2. Description of the Prior Art

Currently, a variety of commercially available seat cushions and back cushions are well known for their design to include a foam piece and a fabric piece combined together through an external force pressing process under high temperature conditions. There are two notable problems with the product made from this manufacturing method. On the one hand, when the foam piece tends to be thick, the product's buffering functionality is limited, and thereby resulting in sore experience. On the other hand, when the foam piece tends to be soft, the well-perceived elastic buffering functionality is compromised by making the user's body more susceptible to be caught up in the foam, thereby raising inconvenience for the user.

In view of these, prior technology has attempted to use needle sewing as a means to combine cushioning materials and fabric layers in order to enhance the buffering functionality of cushioning support product. Although such method of combination is capable of reducing degrees of collision and enhance ways to prevent such collision, there raises problems wherein the friction between user's skin and the woven works, resulting in skin ache or swollen skin and not to excluding skin wound or inflammation. Furthermore, the apparent woven works on the fabric surface is prone to wane down consumer's purchasing desire in terms of product appearance and functionality.

In addition to the aforementioned drawbacks, cushioning support device made from needle sewing has been observed to have the problems of easier release or break-off of the woven works, thereby leading to displacement of the cushioning material, and therefore causing inconvenience to the consumers. Indeed, the displacement of the cushioning material can significantly lower the cushioning material's desired benefits to the user's body parts.

Furthermore, different kinds of pressure-redistributing pads used for redistributing weight or pressure over a specific surface are everywhere in our daily lives. Examples are bubble sheets used for packaging fragile articles, rubber pads for use in providing structural support to items and reducing vibration, and soft pads for use in giving structural support for human bodies, such as mattresses, seat cushions, backrest cushions, and pillows. Of particular note among them is the soft pad for supporting for human bodies because it should not only provide soft comfort for its users, it must also have breathable, weight-redistributing, and human-body-supporting capabilities.

Currently known soft pads are designed to be made of different materials and by different structural configurations for the purpose of giving supportive, pressure-distributive, and soft effects. The materials commonly used in these include foam bodies, plastically deformable foam (polyurethane material), natural cotton, emulsions, and gels, where each material has their distinct properties and applicable conditions. Gels, for an example, are a plastic colloidal material known for their phenomenal pressure transferring capability and impact absorbing capability. The strong trend in increased number of pressure-redistributing pads using these gels is because of this reason.

Cushion matrix as discussed in U.S. Pat. No. 6,677,026 discloses a shock damping cushion that has a base sheet and a cover sheet welded together by use of heat or supersonics. In this invention the weld lines separate the damping region into a number of chambers presented in a rectangular arrangement, and gels or gel-like buffer materials fill the chambers therein, for which it is intended that the gels can work as a solution for resolving the conventional problem in which gas-filled (e.g. air) bubble sheets are not appropriate for application in bearing heavy weight or pressure-changing environment (e.g. air transport).

When the shock damping cushion of the '026 patent is used in providing structural support for articles, only the gels are used in bearing and redistributing the weight of the article. Each of the chambers filled with gels is an dependent space, and the gels therein are designed to fill the entire room in the chamber. When the gels are subject to weight compression and prone to change their shape, such can apply considerable pressure against the chamber, therefore the base sheet and the cover sheet in each chamber are required to have excellent resilience and strength, so as to avoid fracture. From another perspective, when the gels in the chambers are compressed to a level where no more shape changing is permissible, their buffer capability would decrease and would become more rigid as compared to when they are not compressed, this is an adverse effect that could result if the gel's permissible room for shape change is limited. In another perspective, in order to prevent the gels from leaking out of the base sheet and cover sheet due to compression, the breathability of the base sheet and the cover sheet should be of a less superior quality. This condition is at the same time indicating for the shock damping cushion to be required for disposition of a number of holes between every two neighboring chambers.

Although the shock damping cushion as discussed in the '026 patent can serve as a means for resolving the issues with conventional bubble sheets, the structure design of this shock damping cushion is fundamentally not appropriate for operating as a soft cushion for supporting a human body. The reason for this is because the level of comfort and breathability it can offer are not ideal to pass, and the resulting coordination between the human body and the shock damping cushion can easily create a discomforting sense.

SUMMARY OF THE INVENTION

The present invention provides a cushioning support device for supporting a human body, comprising a first polyurethane foam, a second polyurethane foam, wherein the first polyurethane foam has a non-slip sheet attached on a bottom surface of the first foam, and the second polyurethane foam has a resting sheet attached on a top surface of the second foam sheet. A compound pressure-redistributing body is disposed at a predetermined location that is a part of the stacking between the first and second polyurethane foams. There is a weld line welded along the perimeter of the compound pressure-redistributing body between the first polyurethane foam and the second polyurethane foam. The winding of weld line creates at least an internal pocket, in which the compound pressure-redistributing body can be stored, which is designed in such a way that the internal pocket's space is larger than the pressure-redistributing body's volume. The location of the internal pocket is the location for supporting a human body. The compound pressure-redistributing body comprises a foam and a solid gel attached on a top surface of the foam, wherein parts of the solid gel is attached on the foam by way of welding, which can make the gel lodge into small interstices of the foam. After the gel is hardened, the gel would naturally form a solid gel on the foam; the solid gel would be firmly combined to the foam; by way of this example, a cushioning support device characterized by pressure-redistributing, breathable, heat transferring capabilities is provided.

In an example of the present invention, the cushioning support device has multiple internal pockets, wherein there is an interconnecting passage per between at least two internal pockets. The solid gel that radially shoots outward as a result of compression can still be structurally supported by the foam and extend along the passage, where the foam can extend to change its shape to disperse the pressure applied onto the solid gel.

In another example of the present invention, the area of the foam is a little larger than the area of the solid gel in such a way that when the solid gel is compressed and shoots radially to extend outwardly, the solid gel can be supported by the foam and not become squeezed out of the internal pocket.

In yet another example of the present invention, there further comprises a plastic film, which works to cover the compound pressure-redistributing body, such that mineral oils of the solid gel is prevented from spilling.

In another aspect of the invention, the invention provides a method of making of a cushioning support device, comprising the steps of: providing a compound pressure-redistributing body, the compound pressure-redistributing body comprising a foam and a solid gel attached on a top surface of the foam, wherein parts of the solid gel lodge into small interstices of the foam material, and the area of the foam of the compound pressure-redistributing body is larger than the area of the foam of the solid gel; providing and heating a thermo-pressing mold, the thermo-pressing mold comprising a bottom mold and a top mold, wherein the bottom mold has a number of standing bottom separating boards, and between every two neighboring bottom separating boards there is created a depth-defining cavity, top ends of the bottom separating boards are arrayed along a predetermined trail of a weld line, and at least a part of the weld line winds around a periphery at a predetermined location on the cushioning support device for use in supporting a human body weight to define a space for an internal pocket, the top mold has a planar pressure-applying surface, and the planar pressure-applying surface is applicable for entirely covering the top ends of the bottom separating boards; facing down the second polyurethane foam having the resting sheet and covering a second polyurethane foam on the top ends of the bottom separating boards of the bottom mold; disposing the compound pressure-redistributing body on top of the second polyurethane foam, subject to the compound pressure-redistributing body being located at a position corresponding to a position of the internal pocket, the solid gel being disposed facing downward, which means the solid gel is disposed beneath the foam; covering the first polyurethane foam on top of the second polyurethane foam and sandwiching the compound pressure-redistributing body between the first polyurethane foam and the second polyurethane foam; and pressing the top mold against the top of the first polyurethane foam, subject to the first polyurethane foam and the second polyurethane foam becoming mutually welded together at a pressing zone at the top end of the bottom separating board of the bottom mold to form a weld line, the storage room of the internal pocket is larger than the volume of the compound pressure-redistributing body, and the top surface of the internal pocket protrude to catch the surfaces of the first polyurethane foam and the second polyurethane foam In an example of the method of the current invention, there further comprises a plastic film covering the surface of the solid gel, for use in preventing the oil contained in the solid gel from spilling.

By way of the disclosure described above, it would be obvious for a skilled person to understand the effects and advantages of the current invention, which follow: when subject to bearing the human weight, the storage room of the internal pocket is larger than the volume of the compound pressure-redistributing body, such that the foam can support the gel and buffer the pressure on the gel from the bottom of the solid gel. This can balance out the pressure applied on the solid gel, and provide room for accommodating the shape change of the solid gel. The solid gel that expands longitudinally and outwardly as a result of compression can still be supported by the foam having larger area. The compound pressure-redistributing body disposed separately inside two internal pockets are expandable along the interconnecting passage, which can make the solid gel expand and change its shape so as to redistribute the applied pressure, thereby preserving the solid gel's sound pressure-reducing and shock-absorbing capabilities.

BRIEF DESCRIPTION OF THE DRAWINGS

FIG. 7A shows a view of FIG. 6 along the provisional section defined by III-III;

DETAILED DESCRIPTION OF THE INVENTION

Figure 1:
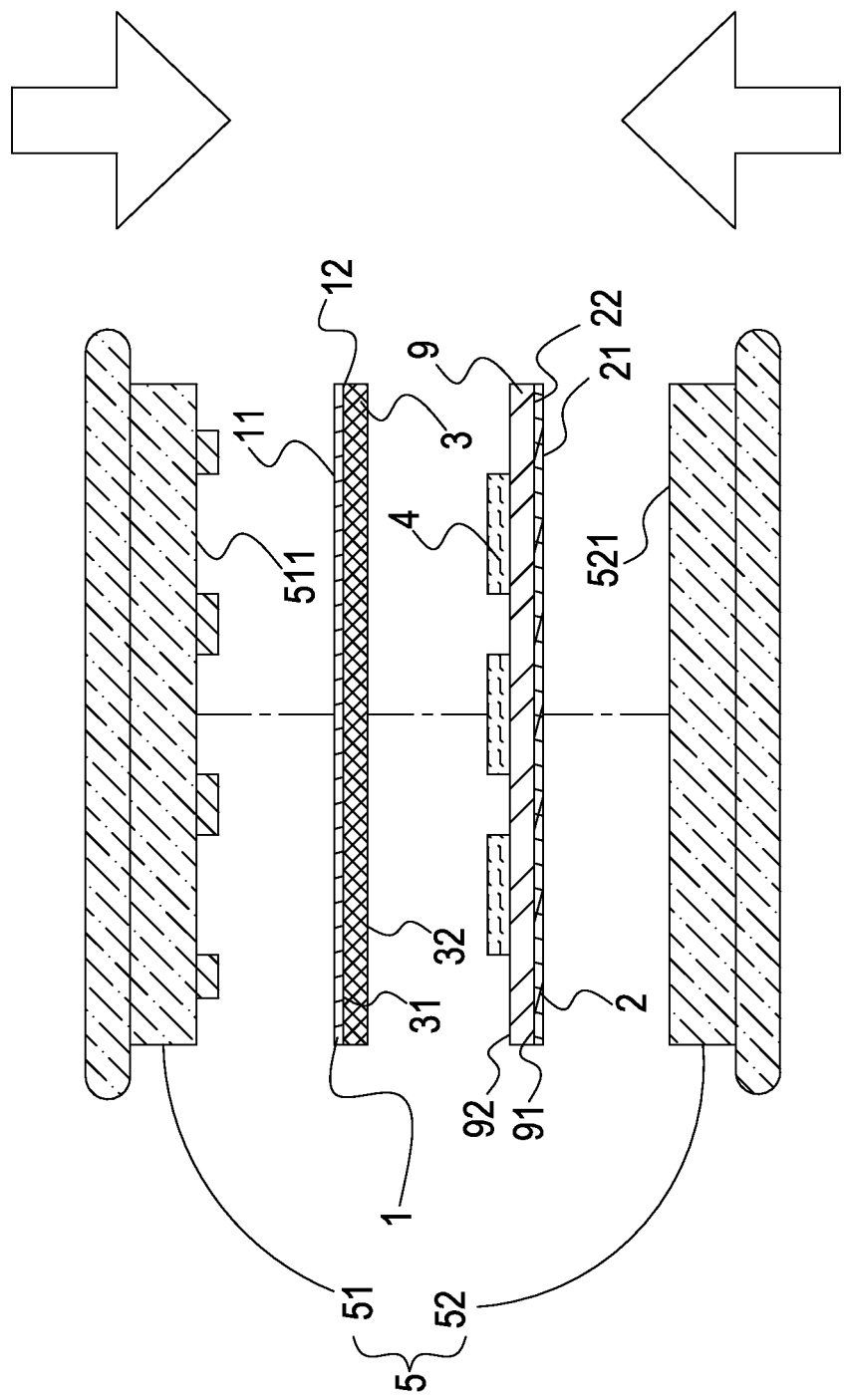
FIG. 1 shows a first example of the thermo-pressed cushioning device according to the present invention.
Figure 2A:
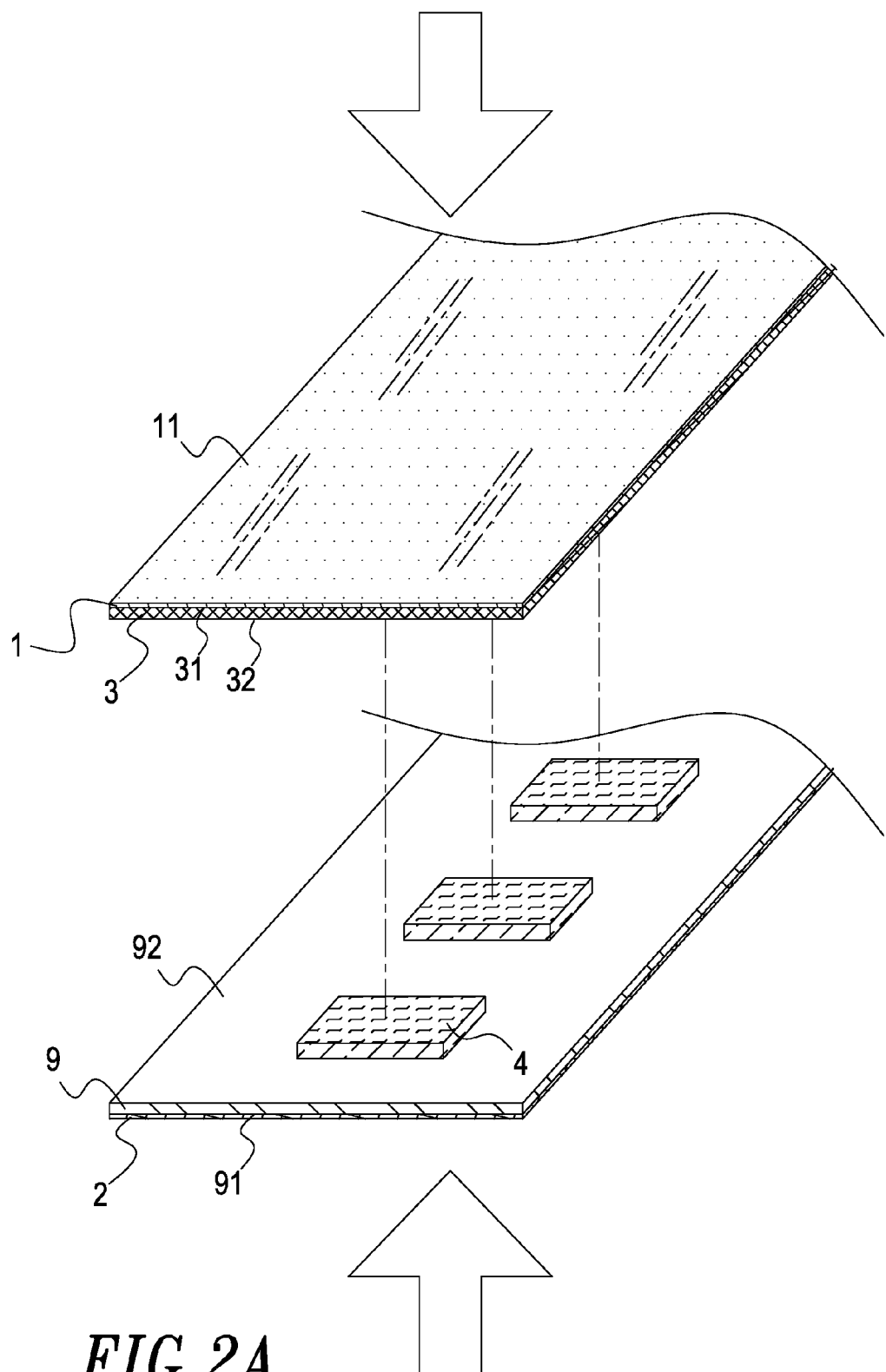
FIGS. 2A and 2B show a first example of the thermo-pressed cushioning device according to the present invention.
Figure 2B:
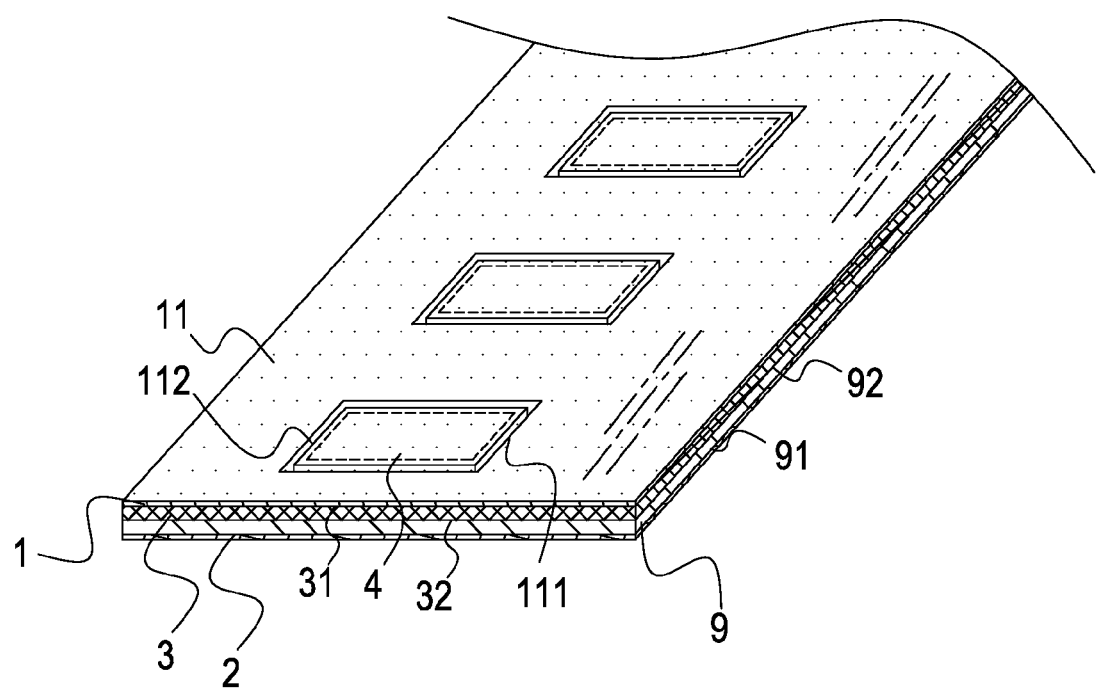
Figure 3:
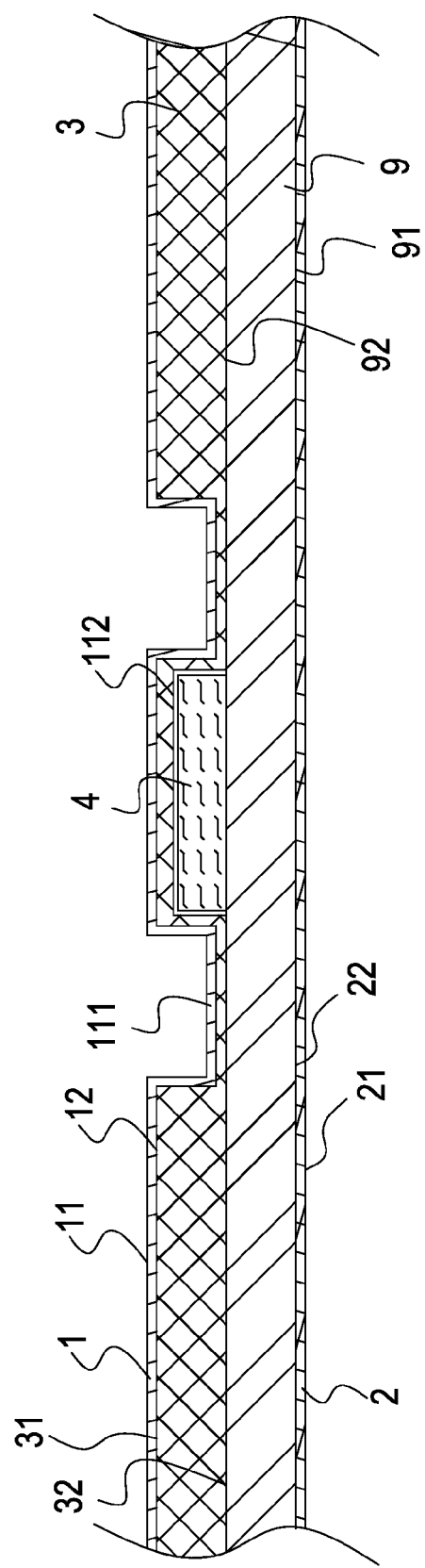
FIG. 3 is a cross-sectional view of the thermo-pressed cushioning device according to the present invention.

Referring to FIGS. 1~4, the illustrated invention provides a cushioning support device comprising a covering sheet 1, wherein the covering sheet has a first major surface 11 and a second major surface 12, and the first major surface 11 of the covering sheet 1 has a tufted surface; a topping sheet of cushioning material 3, wherein the topping sheet of cushioning material has a first major surface 31 and a second major surface 32, wherein the second major surface 32 of the covering sheet 1 is attached onto the first major surface 31 of the topping sheet of cushioning material 3; a non-slip sheet 2, wherein the non-slip sheet has a first major surface 21 and a second major surface wherein the first major surface 21 of the non-slip sheet 2 is slip resistant; a substrate sheet of cushioning material 9, wherein the substrate sheet of cushioning material has a first major surface 91 and a second major surface 92, wherein the second major surface 22 of the non-slip sheet 2, is attached onto the second major surface 92 of the substrate sheet of cushioning material 9; at least one padding 4, which is attached onto a predetermined location situated between the second major surface 32 of the topping sheet of cushioning material 3 and the first major surface 91 of the substrate, sheet of cushioning material 9.

As per manufacturing the thermo-pressed cushioning support device, the foregoing covering sheet 1, topping sheet of cushioning material 3, non-slip sheet 2, substrate sheet of cushioning material 9, and padding 4 are bound together through a thermo-pressing treatment that subjects thermo-pressing apparatus 5 on the first major surface 11 of the covering sheet 1 and the first major surface 21 of the non-slip sheet 2 to a heat pressing process which performs the binding around the neighborhood of the padding 4, causing the topping sheet of cushioning material 3 and the substrate sheet of cushioning material 9 to be melted and melded together. Until about the temperature condition cools off, thermo-binding lines or regions of geometric shapes 111 are formed on the covering sheet 1 and the topping sheet of cushioning material 3 in addition to internal pockets 112 formed therefrom, wherein support padding 4 is enclosed.

In one notable aspect, the covering sheet 1 is made from fabric, linen, or leather. In another notable aspect, the non-slip sheet 2 is used for the purpose of reducing a prescribed slippery condition, and the non-slip sheet 2 is made from fabric, linen, leather, or a similar non-slip material that can provide the same slipperiness-reduction functionality.

Furthermore, the topping sheet of cushioning material 3 and the substrate sheet of cushioning material 9 are made from polyurethane (PU) foam. The PU foam has a chemical property of turning liquid and viscous when heated to an elevated temperature. This property gives benefit to tightly glue together the topping sheet of cushioning material 3 and the substrate sheet of cushioning material 9, and allows for moldable depression on the topping sheet 3 and the substrate sheet 9 as the PU foam cools down on locations where deformations are created post the thermo-pressing treatment. The solidified PU foam stays in this structural configuration after the cooling.

In another notable aspect, the padding 4 is made from gels, latex, silica gels, or other elastomeric materials so as to enabling the padding 4 ability to distribute any perceived applied impact, and therefore offering an embodiment of the present invention that is supportive, capable of absorbing mechanical vibration, dispersing external pressure, and buffering impact. Furthermore, the foregoing elastomeric materials can be prepared in various surface pattern configurations depending on consumers' request, such as spider-webs, gridlines, blocks, perforations, raised-bubbles or embossed indentions.

In another aspect, the padding 4 is made front memory foam, enabling the padding 4 to change its structural shape subject to user's body temperature. More specifically, this means that the padding 4 is responsive to receiving changes in objects subject to the present invention's support.

In another aspect, the thermo-pressing apparatus 5 includes a male binding member 51 and a female binding member 52, wherein the female binding member 52 has a flat surface 521, and one surface of the male binding member 51 has a plurality of grooved regions 511, wherein each of which has a size corresponding a padding 4. The male binding member 51 and the female binding member 52 compress against each other when the thermo-pressing process is underway, where the male binding member 51 moves in such a way to act on the first major surface 11 of the covering sheet 1, while the female binding member 52 moves in a directly opposite way to act on the first major surface 21 of the non-slip sheet 2. After the pressing process is performed a plurality of thermo-binding lines or regions 111 having geometric patterns are created on the first major surface 11 of the covering sheet 1, while in the same time as the padding 4 pushes upward against the covering sheet 1 and the topping sheet of cushioning material 4 to produce an internal pocket 112 outlining the neighboring thermo-binding lines or regions 111

Furthermore, the padding 4 described herein is arranged partially between the topping sheet of cushioning material 3 and the substrate sheet of cushioning material 9, therefore is lighter in weight and is easy to carry.

The reader will appreciate that the aforementioned support device could be further processed to be configured for use in various occasions, including but not limited to, mattress topper, seat cushion, or couch cushion.

Figure 4:
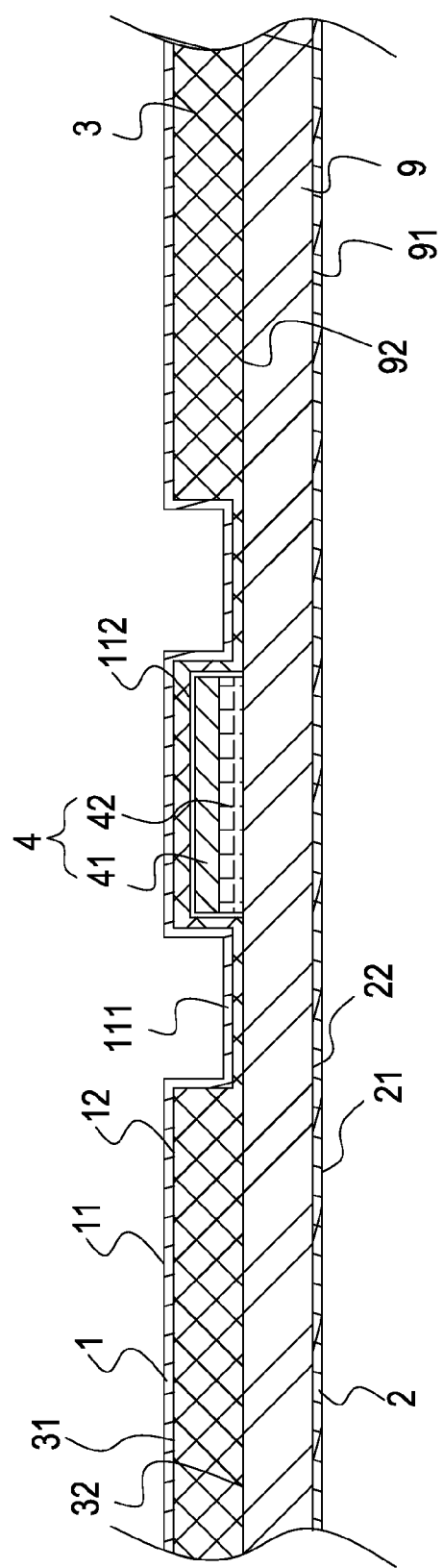
FIG. 4 is exemplary of the third example of the thermo-pressed cushioning device according to the present invention.

In reference to FIG. 4, the padding 4 comprises a shock absorbing compound 41 overlaying upon a modeling compound 42, which instills in the padding 4 functionalities including but not limited to ability to support, absorb vibration, disperse external pressure, buffer impact, and transform in response to heat.

In one notable aspect, the shock absorbing compound 41 is made from gels, latex, silica gels, or other elastomeric materials. The modeling compound 42 can be made from memory foam. In practice, implementation of the foregoing materials can be realized in ways including one wherein the shock absorbing compound 41 provides a means to take in tension and distributively transfer the tension, and further the modeling compound 42 transforms its shape in response to elevated temperature. Accordingly, this can provide desired benefits to the present invention, including comfort support and tension reduction around a user's neck, back, waist, and legs portion when the thermo-pressed cushioning support device is applied into furniture including but not limited mattress topper, seat cushion, or back cushion.

In another aspect, the relative position of the shock absorbing compound 41 and modeling compound 42 within a stack having both compounds is receptive to change upon demand.

Figure 5:
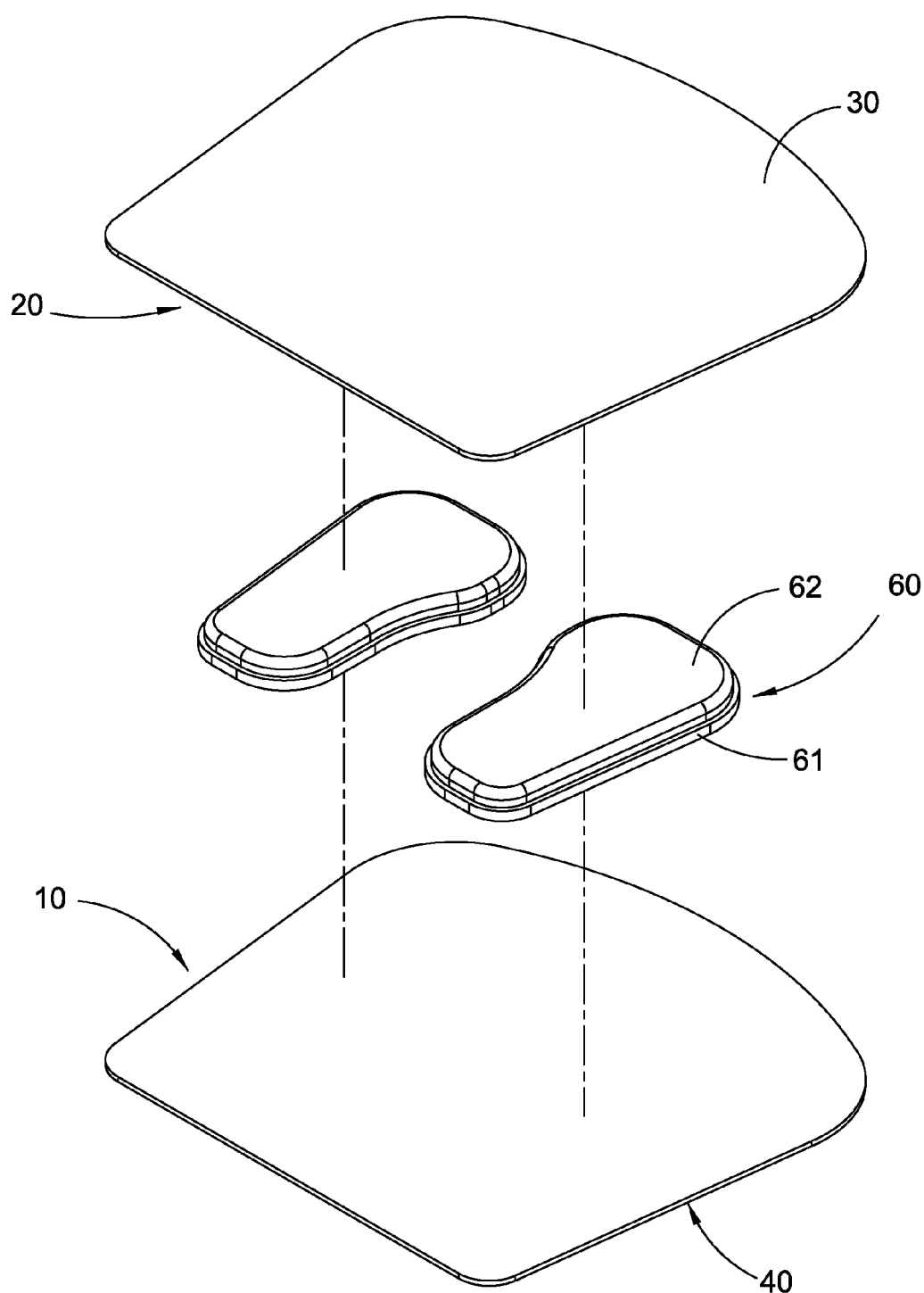
FIG. 5 shows an example of the present invention, showing a schematic view of the components for the cushioning support device.
Figure 6:
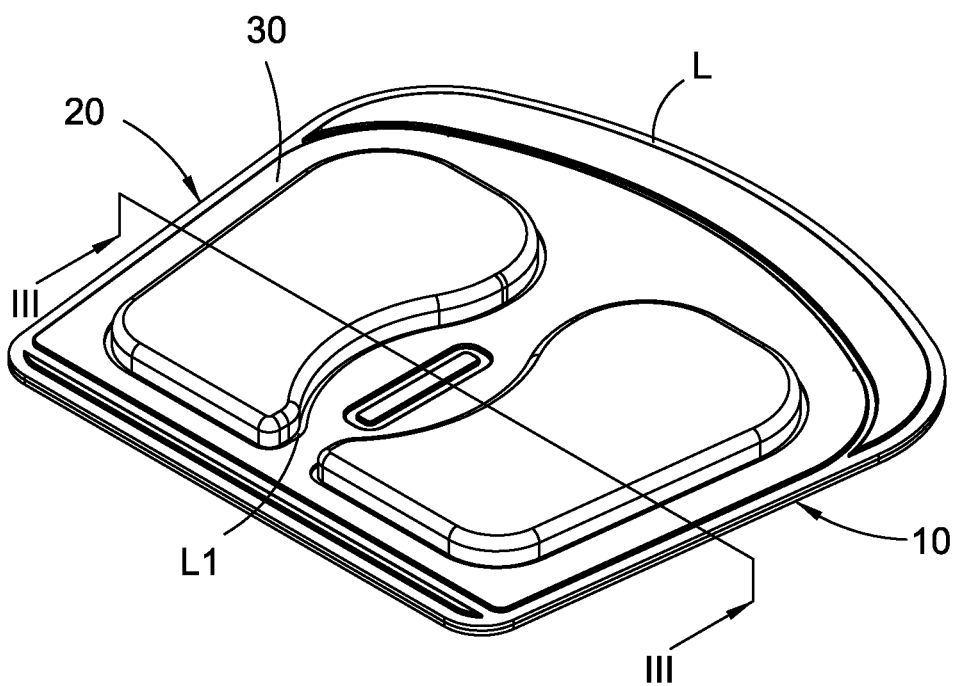
FIG. 6 shows an example of the present invention, showing an isometric view of the cushioning support device.

In reference to FIGS. 5 and 6, an example showing the structure of the present invention is shown, in which the disclosed cushioning support device comprises a first polyurethane foam 10, a second polyurethane foam 20, the second polyurethane foam 20 has on its op surface a resting sheet 30. The first polyurethane foam 10 has on its bottom surface a non-slip sheet 40. The resting sheet 30 and the non-slip sheet 40 are all comfortable stretch fabrics. The resting sheet 30 is attached to the top surface of the second polyurethane foam 20 by way of sticking or other processing cans. The non-slip sheet 40 can provide a non-slip capability, the non-slip sheet 40 is selected from any of woven, elastic knitted fabric, leather or non-slip material.

Figure 7B:
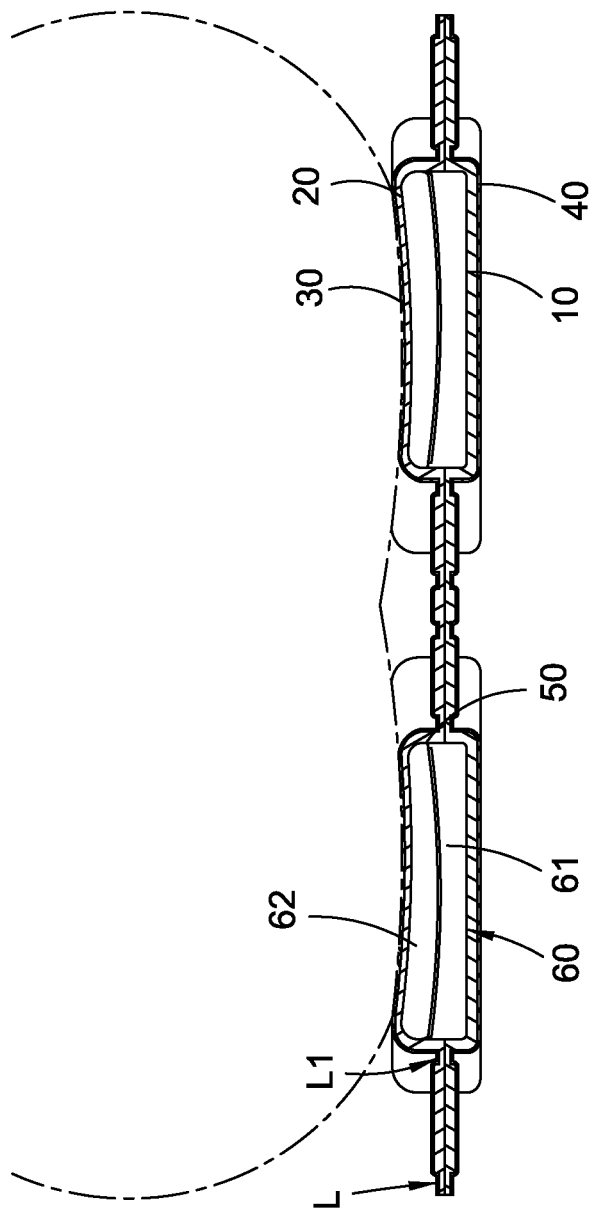
FIG. 7B demonstrates a user using the present invention, showing a cross-sectional view of the cushioning support device when it is subject to compression.
Figure 8:
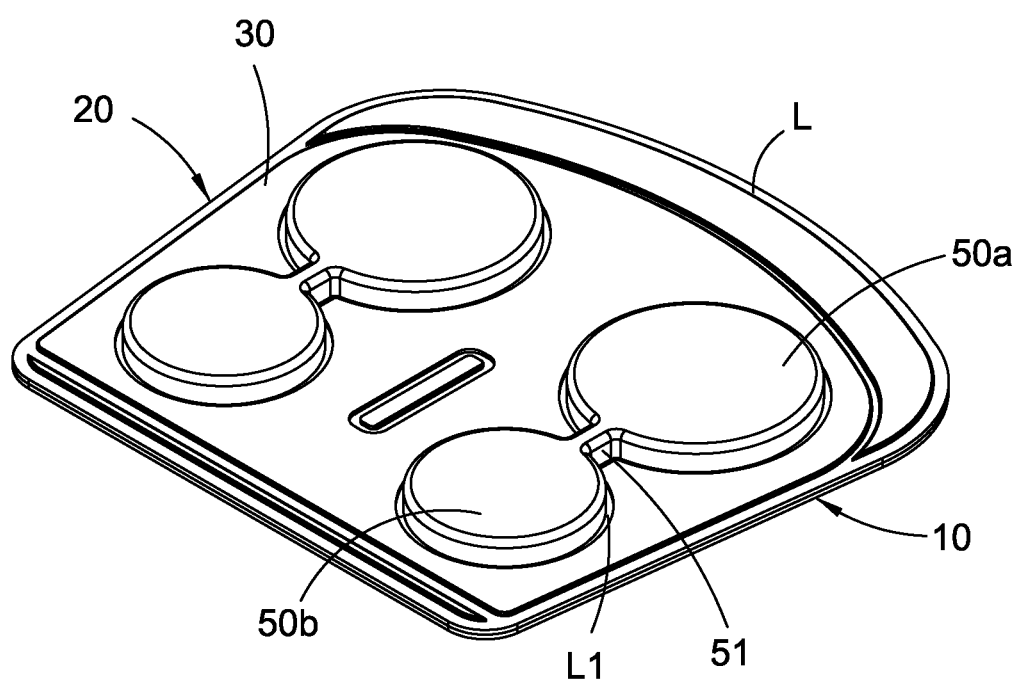
FIG. 8 is another example of the present invention, showing an interconnecting passage between at least two internal pockets.
Figure 9:
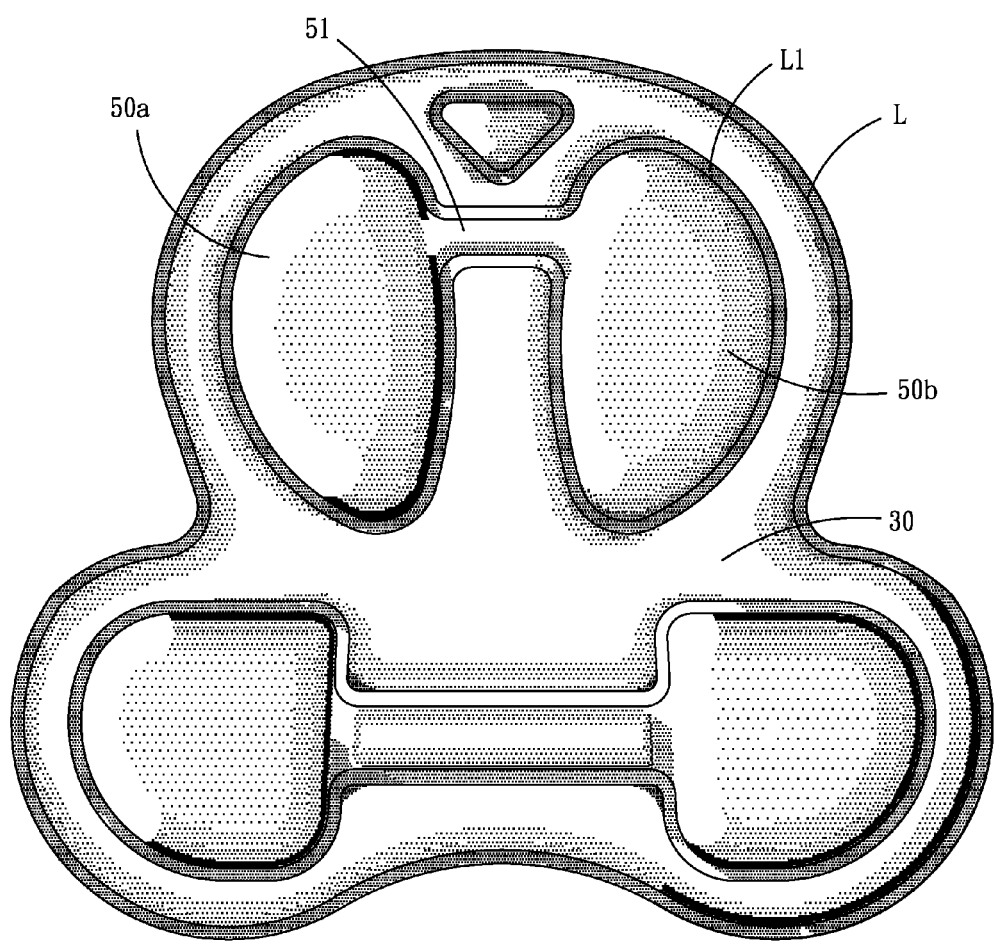
FIG. 9 is another example of the present invention, showing a frontal view of another cushioning support device.
Figure 10:
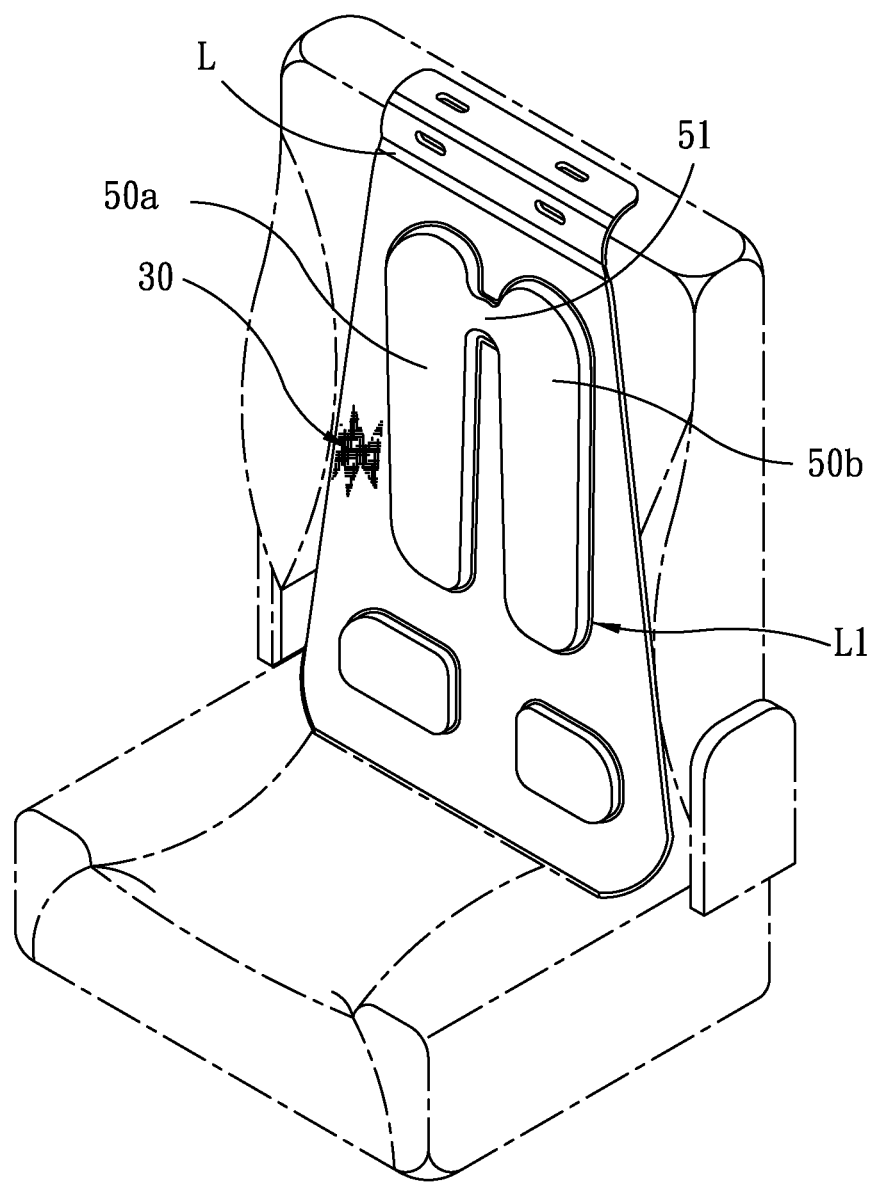
FIG. 10 is another example of the current invention, showing a frontal view of another cushioning support device.

The second polyurethane foam 20 and the first polyurethane foam 10 are arranged one over another in a top-down manner into a stack and are welded together along a trail of weld line L. The winding of the weld line L1 between the first polyurethane foam 10 and the second polyurethane foam 20 forms at least an internal pocket 50 (see FIG. 7A). Basically the weld line L still maintains its course of expansion along the periphery of the cushioning support device. The internal pocket 50 is located at a position on the cushioning support device for use in supporting a human body, and the quantity and location of the internal pocket 50 vary depending on the purpose of the cushioning support device. In other words, there may be more than one internal pocket 50. The cushioning support devices shown in FIG. 5, FIG. 8, and FIG. 9 are use for installment as seat cushions on seats, there is disposed on the left and right sides of the seat cushions to correspond to a user's bottom, such design is intended to support a user's body weight. As shown in FIG. 10 for other cushioning support device, which shows a backrest cushioning support for installment as backrest cushions on backrest, there is disposed on the left and right sides of the seat cushions to correspond to a user's vertebral column. Each internal pocket 50 has within itself a compound pressure-redistributing body 60. The storage volume of the internal pocket 50 can be larger than the compound pressure-redistributing body 60, allowing the compound pressure-redistributing body 60 has room permitting shape change. The compound pressure-redistributing body 60 comprises a foam 61 and a solid gel 62 attached to the top surface of the foam 61. The area of the foam 61 is a little larger than or equal to the area of the solid gel 62. In other words, the solid gel 62 is located inside the foam 61's center and creates an interstice between itself and foam 61's side. (FIG. 5). As shown in FIG. 7B, any compound pressure-redistributing body 60 subject to compression and resulting in radially shooting outwardly can still be supported by the foam 61 having larger area. Additionally, because the storage room of the internal pocket 50 is larger than the compound pressure-redistributing body 60, which makes the compound pressure-redistributing body have an excellent room for shape changing, thereby helping the compound pressure-redistributing body 60 preserve excellent pressure-reducing shock-damping capabilities, and ultimately creating a cushioning support device that is capable of redistribute pressure as well as offering breathable and heat-transferring effects.

As shown in FIG. 8, which shows another example of the present invention, the cushioning support device has multiple internal pockets 50a and internal pockets 50b, wherein there is formed an interconnecting passage 51 between at least two internal pocket 50a and internal pocket 50b. The internal pocket 50a, internal pocket 50b and the passage 51 are formed by the winding of one weld line L1. In other words, the internal pocket 50a and the internal pocket 50b are between the first polyurethane foam 10 and the second polyurethane foam 20, and are regions enclosed by the same weld line L1. When the compound pressure-redistributing body 60 inside any of internal pocket 50a and internal pocket 50b is subject to compression, the solid gel 62 that is expanding longitudinally and outwardly can still be supported by the foam 61 and expands along the passage 51, which can change its shape to redistribute the pressure applied on the solid gel 62.

Figure 11:
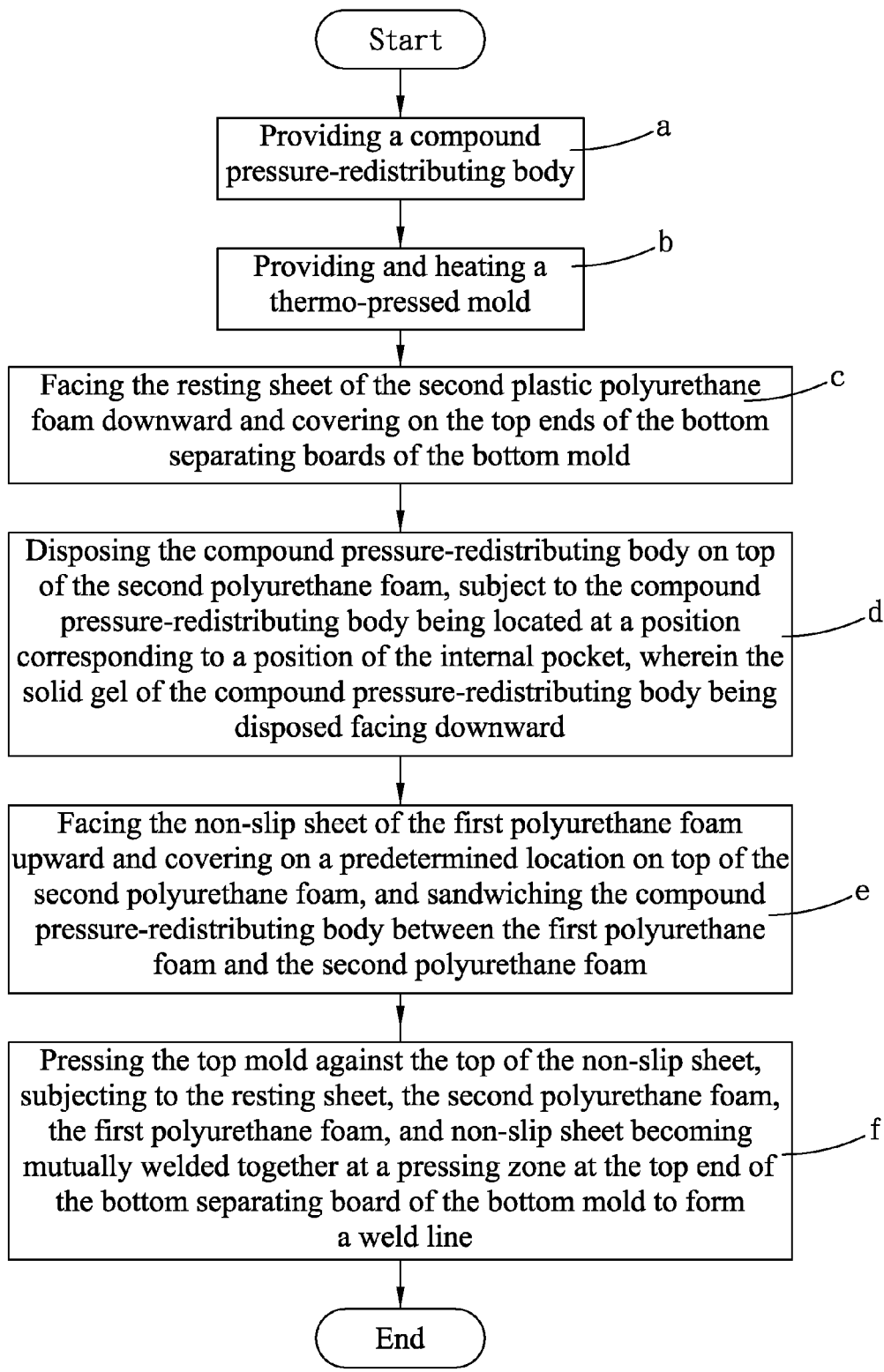
FIG. 11 shows a flowchart for a method of making according to the present invention.
Figure 12:
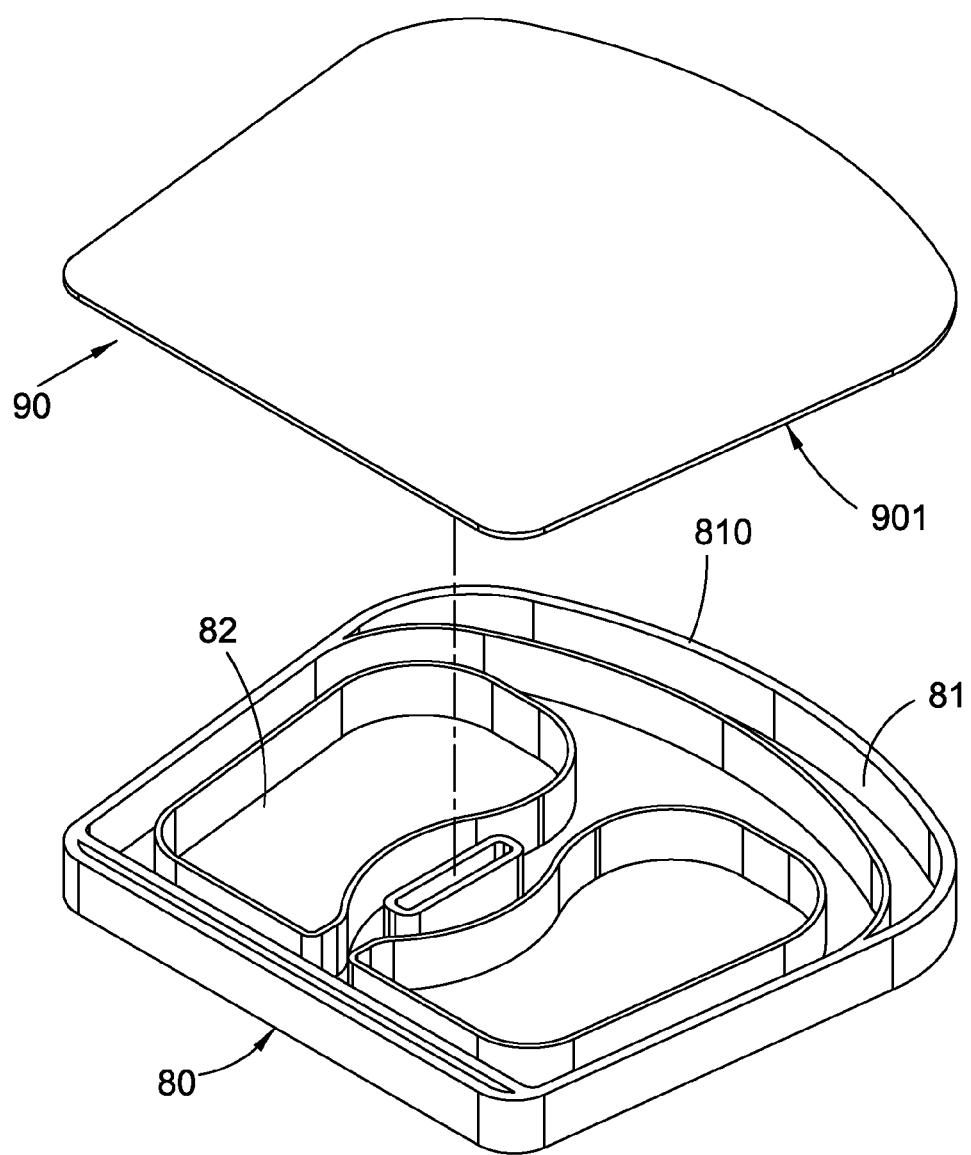
FIG. 12 shows an example according to the present invention, showing a schematic view of the components of the thermo-pressed molds.
Figure 13:
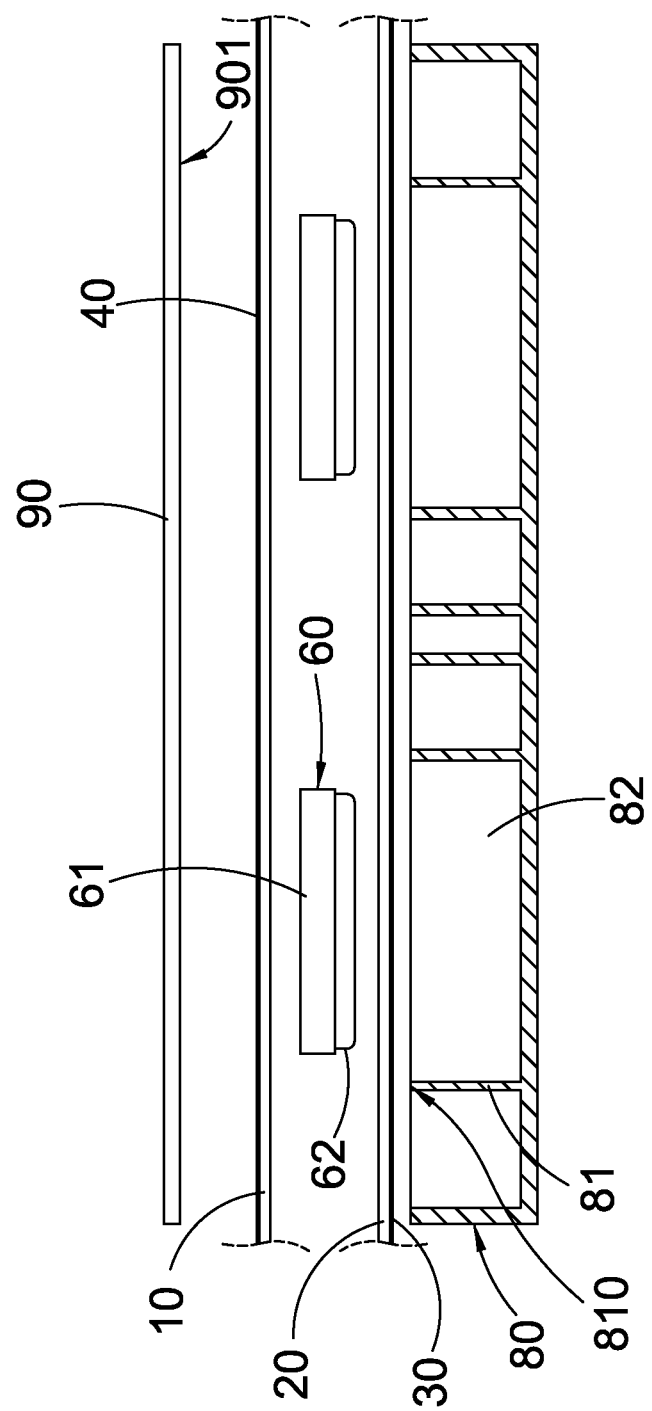
FIG. 13 is a view highlighting operation for the method of making according to the present invention, showing top ends of bottom separating boards of a bottom mold.

As shown in FIG. 11, the present invention further provides a method for making a cushioning support device, comprising the steps of:

a. providing a compound pressure-redistributing body, the compound pressure-redistributing body 60 comprising a foam 61 and a solid gel 62 attached on a top surface of the foam 61, wherein parts of the solid gel 62 lodge into small interstices of the foam 61 material, a solid gel 62 is formed on the foam 61 after the welded solid gel hardens, wherein the solid gel 62 and the foam 61 are firmly combined together, and the area of the foam 61 is larger than the area of the solid gel 62;

b. providing and heating a thermo-pressing mold, as shown in FIG. 12, the thermo-pressing mold comprising a bottom mold 80 and a top mold 90, wherein the bottom mold has a number of standing bottom separating boards 81, and between every two neighboring bottom separating boards 81 there is created a depth-defining cavity 82, top ends 810 of the bottom separating boards 81 are arrayed along a predetermined trail of a weld line L, and at least a part of the weld line L winds around a periphery at a predetermined location on the cushioning support device for use in supporting a human body weight to define a space for an internal pocket, wherein the top mold 90 has a planar pressure-applying surface 901, and the planar pressure-applying surface 901 is applicable for entirely covering the top ends 810 of the bottom separating boards 81, heating the top mold 90 to a Celsius degree of about 200 degrees, and heating the bottom mold 80 to a Celsius degree of about 140 degrees (which may be performed by way of electric heating);

c. facing a second polyurethane foam 20 having the resting sheet 30 downward and covering on the top ends 810 of the bottom separating boards 81 of the bottom mold 80;

d. disposing the compound pressure-redistributing body 60 on top of the second polyurethane foam 20, subject to the compound pressure-redistributing body 60 being located at a position corresponding to a position of the internal pocket 50, wherein the solid gel 62 of the compound pressure-redistributing body 60 being disposed facing downward, in other words, the solid gel 62 is located beneath the foam 61, such that the compound pressure-redistributing body 60 and the cavity 82 of the bottom mold 80 correspond to each other, wherein the cavity 82 is larger than the volume of the compound pressure-redistributing body 60;

e. facing a first polyurethane foam 10 having the non-slip sheet 40 upward and covering on a predetermined location on top of the second polyurethane foam 20 and sandwiching the compound pressure-redistributing body 60 between the first polyurethane foam 10 and the second polyurethane foam 20; and f. pressing the top mold 90 against the top of the non-slip sheet 40, subject to the resting sheet 30, the second polyurethane foam 20, the first polyurethane foam 10, and the non-slip sheet 40 becoming mutually welded together at a pressing zone at the top end 810 of the bottom separating board 81 of the bottom mold 80 to form a weld line L and L1.

Figure 14:
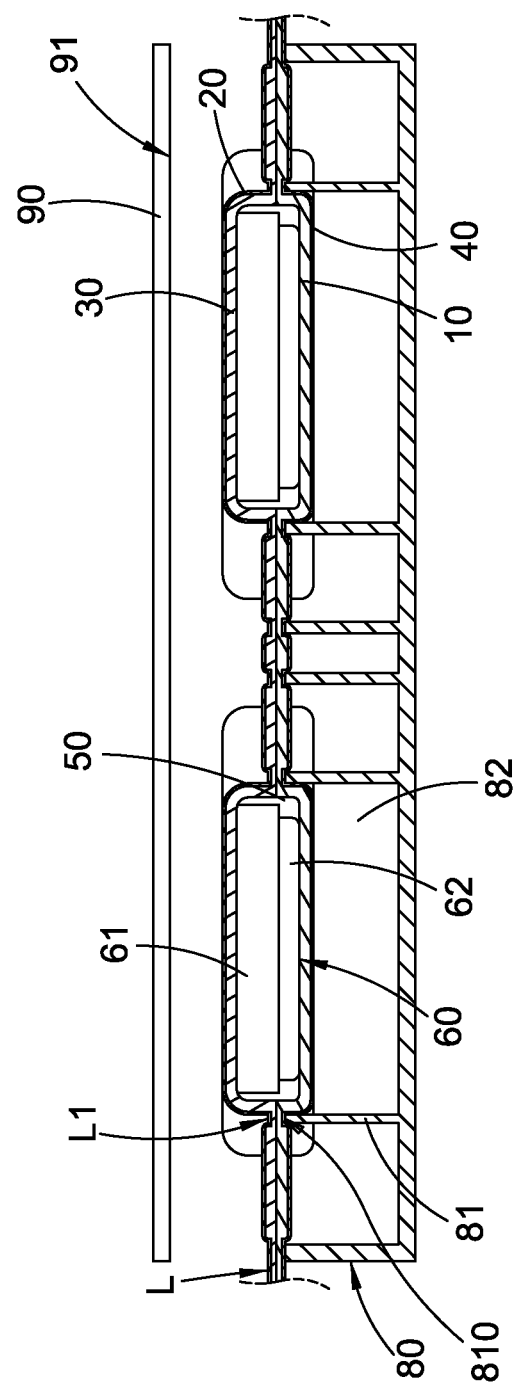
FIG. 14 is a view highlighting operation for the method of making according to the present invention, showing using the bottom mold and a top mold to perform thermo-pressing to make the cushioning support device.

Because during the process of using the thermo-pressing mold to perform thermo-pressing, the compound pressure-redistributing body 60 is enclosed between the first polyurethane foam 10 and the second polyurethane 20, and the first polyurethane foam 10 and the second polyurethane 20 are stacked together to form a certain thickness, so the cavity 82 formed by the circling of the bottom separating boards 81 should have enough space to accommodate the first polyurethane foam 10 and the second polyurethane 20, as well as the compound pressure-redistributing body 60 enclosed therein. Therefore, according to an example of the present invention, the size of the foam 61 of the compound pressure-redistributing body 60 is a little smaller than the cavity 82 formed by the circling of the bottom separating boards 81 (the cavity 82 concerns the cavity 82 located at the internal pocket 50). In other words, if the foam 61 is inserted into the corresponding cavity 82 of the bottom mold 80, the periphery of the foam 61 would not touch the bottom separating boards 81 that circle the cavity 82. This preserves a spacing between the periphery of the foam 61 and the bottom separating boards 81 circling the cavity 82. This spacing can accommodate the thickness created by the staking of the first polyurethane foam 10 and the second polyurethane 20 (See FIG. 14).

The invention has been described herein by illustration of a preferred exemplary embodiment. The specification and drawings are, accordingly, to be regarded in an illustrative rather than a restrictive sense. Further, it will be apparent to those skilled in the art that other embodiments having equivalent modification and change are possible within the scope of the invention.

Because the first polyurethane foam 10, the second polyurethane 20, the resting sheet 30 and the non-slip sheet 40 are all made of an elastic material, after the cushioning support device is made according to the above method, the compound pressure-redistributing body 60 enclosed therein would push these elastic materials outward, making the spots having compound pressure-redistributing body 60 on the two sides of the cushioning support device have a protruding appearance.

Figure 15:
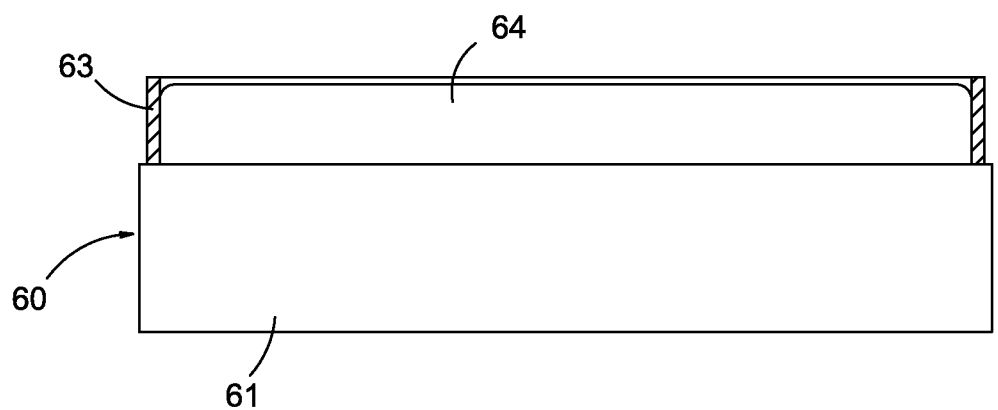
FIG. 15 is a view highlighting operation for the method of making according to the present invention, showing making of a compound pressure-redistributing body.

There is also presented an example for the method of making the compound pressure-redistributing body 60 comprising a foam 61, the foam 61 is a material having numerous pores. The top surface of the foam 61 is disposed with a mold device 63, there is injected at the mold 63 welded gel material 64 (see FIG. 15), making a fraction of the gel material sip into the pores of the foam, and forming a solid gel 62 after the gel material cools down and hardens. The area of the top surface of the foam is a little larger than the area of the solid gel 62.

Figure 16:
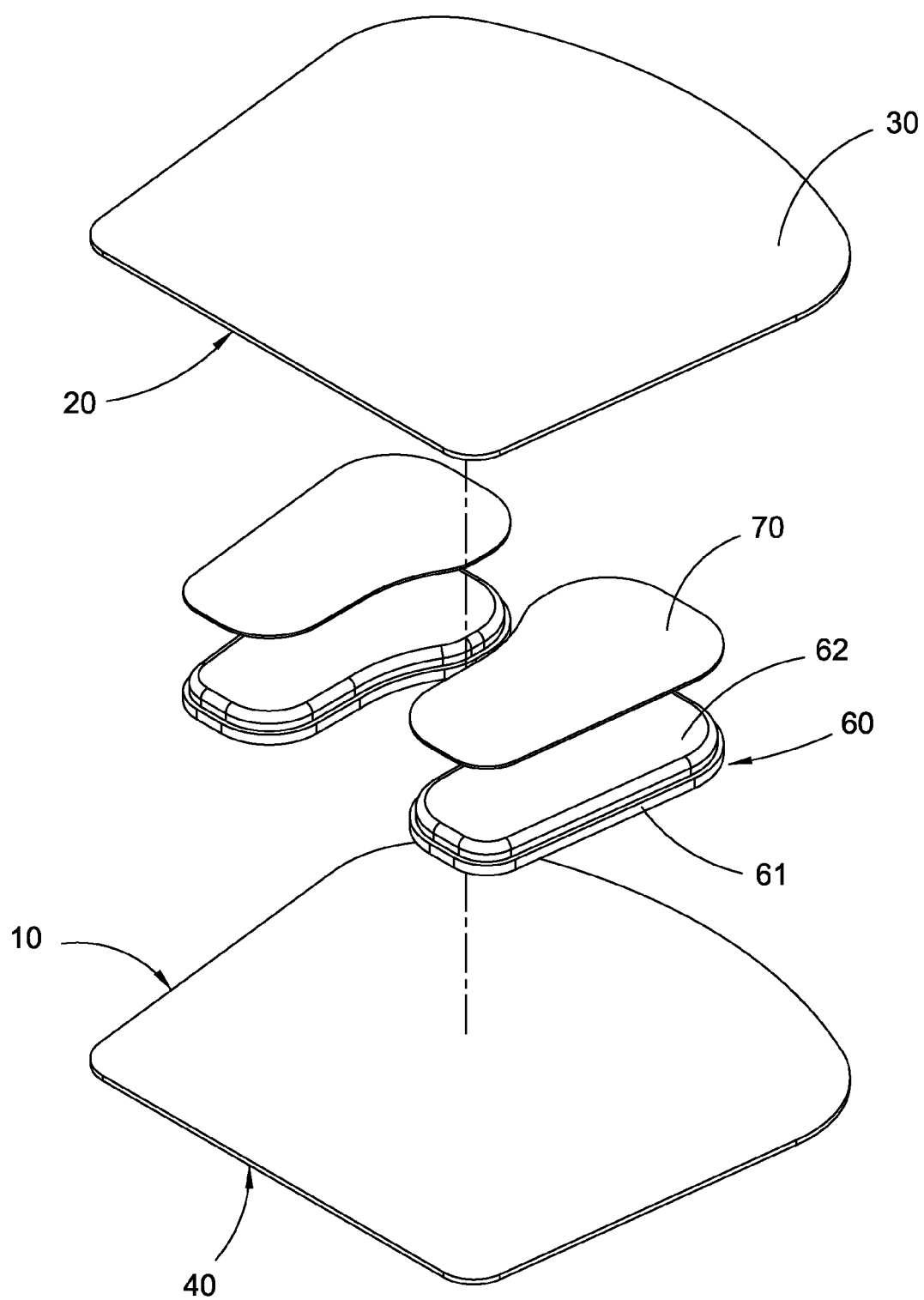
FIG. 16 is an example of the present invention, showing another component configuration for the cushioning support device, wherein there is a plastic film covering the top end of the solid gel of the compound pressure-redistributing body.

FIG. 16 shows another example of the present invention, which further comprises a plastic film 70. In the above method, the plastic film 70 covers on the surface of the solid gel 62 of the compound pressure-redistributing body 60, so as to prevent the oil of the solid gel 62 from spilling.

Figure 17:
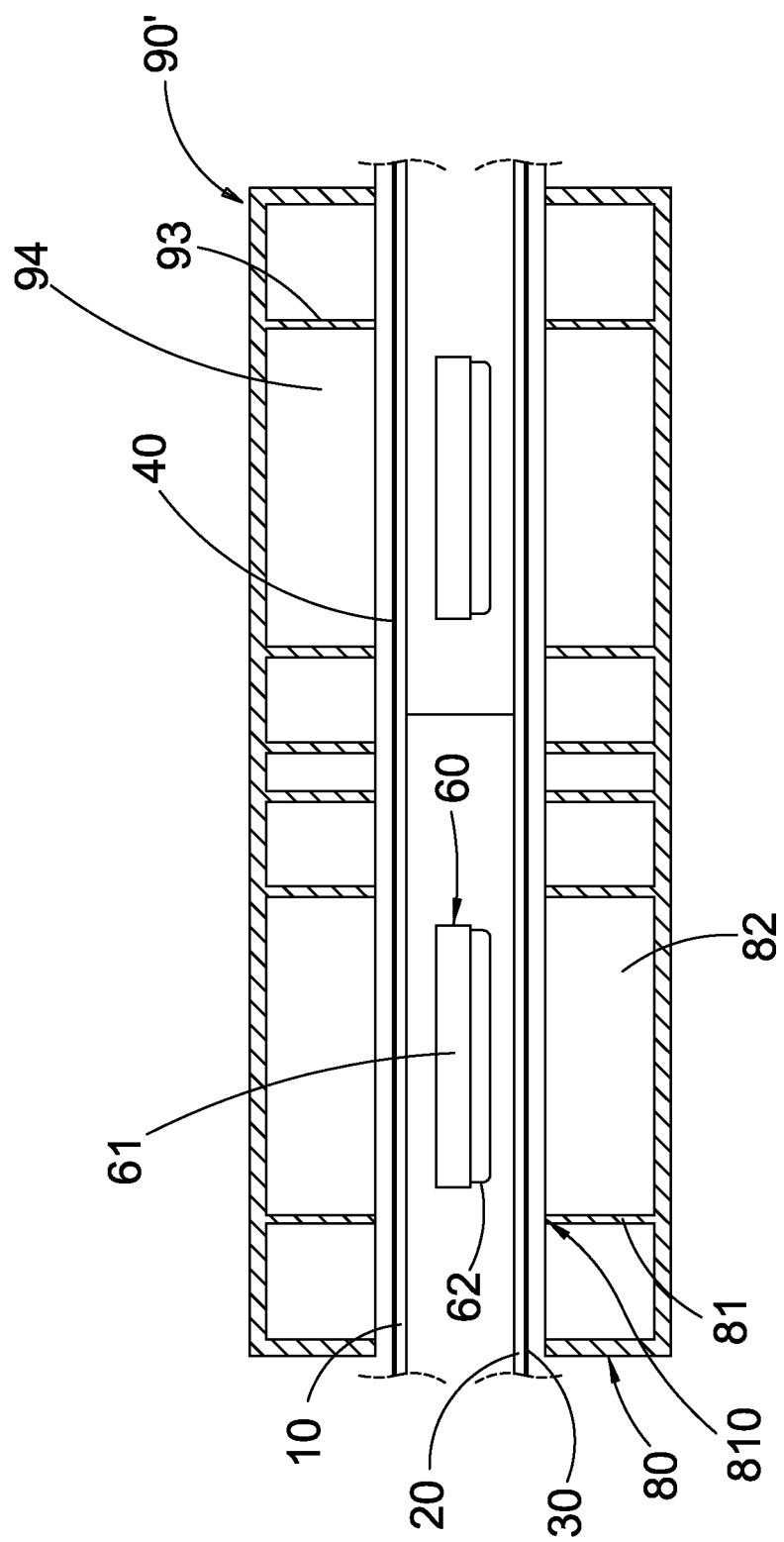
FIG. 17 is an example of the present invention, showing that the top and bottom molds each is disposed with a separating board.

Additionally, as depicted in FIG. 17, the top mold 90 does not necessarily have be a planar surface, but can also have multiple standing separating boards 93, between every two neighboring top separating boards there is formed a depth-defining cavity 94, top ends of the top separating boards 93 are arrayed along a predetermined trail of a weld line, and at least a part of the weld line winds around a periphery at a predetermined location on the cushioning support device for use in supporting a human body weight to define a space for an internal pocket, the weld line corresponds to the weld line of the bottom mold 80.

The present invention has been disclosed as in ended to illustrate its examples, and not intended to be restrictive to those as described. A person skilled in the relevant art may make minor modification or adjustment without departing from the spirit or scope of the present invention, accordingly scope of claim sought to be protected by the current invention is to be determined on the basis of the claims as defined by the current specification.

What is claimed is:

1. A cushioning support device for use in supporting a human body, comprising:
   a first polyurethane foam, wherein the first polyurethane foam has a non-slip sheet attached on a bottom surface of the first foam;
   a second polyurethane foam, wherein the second polyurethane foam has a resting sheet attached on a top surface of the second foam sheet; and
   a plurality of compound pressure-redistributing bodies, wherein each of the compound pressure-redistributing bodies comprises an inner foam and a solid gel attached on a top surface of the inner foam;
   wherein the first and second polyurethane foams are arranged one over another in a top-down manner into a stack and are welded together to form at least one receiving compartment;
   at least one large circular internal pocket coupled to at least one small circular internal pocket with at least an interconnecting passage is disposed in the receiving compartment;
   wherein the large circular internal pocket receives a first one of the compound pressure-redistributing bodies and the small circular internal pocket receives a second one of the compound pressure-redistributing bodies;
   wherein a volume of the first one of the compound pressure-redistributing bodies is smaller than a volume of the large circular internal pocket and a volume of the second one of the compound pressure-redistributing bodies is smaller than a volume of the small circular internal pocket to accommodate the compound pressure-redistributing bodies for shape alteration;
   wherein a top surface of the large circular internal pocket is larger than a top surface of the small circular internal pocket;
   wherein one end of the interconnecting passage is in connection with a periphery of the large circular internal pocket and the other end of the interconnecting passage is in connection with a periphery of the small circular internal pocket;
   wherein the large circular internal pocket, the small circular internal pocket and the interconnecting passage are enclosed by a weld line;
   wherein a lateral wall is extended along the weld line and is connected to a bevel, wherein the bevel is spaced from the weld line;
   wherein the lateral wall is perpendicular to the top surface of the large circular internal pocket and the top surface of the small circular internal pocket;
   wherein the weld line is formed in a groove surrounding the combination of the large circular internal pocket, the small circular internal pocket and the interconnecting passage.

2. The cushioning support device according to claim 1, wherein the foam of the compound pressure-redistributing body is larger than the solid gel such that when the solid gel is subject to a force and led to change shape, the solid gel is absorbed by the foam of the compound pressure-redistributing body, and is prevented from being squeezed out of the foam of the pressure-redistributing body and the internal pocket.

3. The cushioning support device according to claim 1, further comprising a plastic film, wherein the plastic film covers a surface of the solid gel of the compound pressure-redistributing body.

* * * * *